(12) United States Patent
Abe et al.

(10) Patent No.: US 8,705,164 B2
(45) Date of Patent: Apr. 22, 2014

(54) DISPLAY APPARATUS

(75) Inventors: Hironobu Abe, Kanagawa (JP);
Nobuhide Yoneya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 13/419,859

(22) Filed: Mar. 14, 2012

(65) Prior Publication Data
US 2012/0250139 A1 Oct. 4, 2012

(30) Foreign Application Priority Data
Apr. 1, 2011 (JP) ................................ 2011-081614

(51) Int. Cl.
| | |
|---|---|
| *G02F 1/167* | (2006.01) |
| *F04B 19/00* | (2006.01) |
| *G02B 26/08* | (2006.01) |
| *H04N 5/74* | (2006.01) |
| *G03G 17/04* | (2006.01) |

(52) U.S. Cl.
CPC .............. *G02F 1/167* (2013.01); *F04B 19/006* (2013.01); *G02B 26/0841* (2013.01); *G03G 17/04* (2013.01); *H04N 5/7425* (2013.01)
USPC ............. 359/296; 359/295; 345/107; 430/32; 204/600

(58) Field of Classification Search
USPC .......... 359/295, 269, 273, 290–296; 345/107; 430/32; 204/600
See application file for complete search history.

(56) References Cited

U.S. PATENT DOCUMENTS 7,829,795 B2 * 11/2010 Kawase et al. ................. 174/254

FOREIGN PATENT DOCUMENTS

| | | |
|---|---|---|
| JP | 2001-125149 | 5/2001 |
| JP | 2006-227053 | 8/2006 |
| JP | 2009-145833 | 7/2009 |
| JP | 2010-231230 | 10/2010 |

* cited by examiner

*Primary Examiner* — Evelyn A Lester
*Assistant Examiner* — Daniele Manikeu
(74) *Attorney, Agent, or Firm* — Rader, Fishman & Grauer PLLC (57) ABSTRACT

Disclosed herein is a display apparatus including first and second substrates, at least one of which has a light transmitting characteristic, as well as first and second electrodes provided on the two mutually facing surfaces of the first and second substrates respectively; and an electrophoretic device provided between the first and second substrates, wherein the first substrate and the first electrode each have an external edge folded back so as to cover at least a portion of a terminal surface of the second substrate.

10 Claims, 4 Drawing Sheets

DISPLAY APPARATUS

BACKGROUND

The present disclosure relates to a display apparatus employing electrophoretic devices.

In recent years, there have been proposed reflection-type display apparatus each serving as the display unit of the so-called electronic book terminal in the reading application. The reflection-type display apparatus include an electrophoretic display apparatus drawing much attention. The electrophoretic display apparatus makes use of an electrophoretic phenomenon in order to generate contrast. The electrophoretic display apparatus draws much attention because the apparatus consumes only little power and has a high response speed.

The electrophoretic display apparatus typically has a structure in which electrophoretic dispersion liquid is sealed in a space between a first substrate and a second substrate to serve as a display material. On the first substrate, pixel electrodes are laid out to form a matrix. On the second substrate, on the other hand, counterpart electrodes facing the pixel electrodes are provided. The electrophoretic dispersion liquid is a liquid dispersion medium to which electrophoretic particles have been added. Differences in electric potential between the pixel electrodes and the counterpart electrodes change the state of distribution of the electrophoretic particles. As a result, the optical characteristic of the electrophoretic dispersion liquid changes. The changes of the optical characteristic of the electrophoretic dispersion liquid are used to create an image and characters. For more information on the known technologies, the reader is advised to refer to Japanese Patent Laid-open Nos. 2001-125149, 2006-227053, 2009-145833, and 2010-231230.

SUMMARY

By the way, the known electrophoretic display apparatus includes a pair of substrates facing each other to form a substrate pair. As shown in FIG. 1 of Japanese Patent Laid-open No. 2001-125149 for example, on one of the mutually facing surfaces of the substrates, there are provided a connection electrode, an external-connection terminal and a signal processing circuit to mention a few. As a result, the size of the effective display area in the substrate pair is contracted.

It is thus an aim of the present disclosure addressing the problem described above to provide a display apparatus having a structure properly allowing enlargement of the ratio of the effective display area to the entire display area.

A display apparatus provided by the present disclosure includes first and second substrates as well as an electrophoretic device provided between the first and second substrates. In the display apparatus, at least one of the first and second substrates has a light transmitting characteristic. On the two mutually facing surfaces of the first and second substrates, first and second electrodes are provided. The first substrate and the first electrode each have an external edge folded back so as to cover at least a portion of a terminal surface of the second substrate.

In the display apparatus provided by the present disclosure, as described above, the first substrate and the first electrode each have an external edge folded back to cover at least a portion of a terminal surface of the second substrate. Thus, a voltage can be supplied from a side close to the second substrate to the first electrode through the external edges. As a result, the outer surface of the first substrate can be used as a display screen. Accordingly, an electrophoretic device can be provided also on the peripheries of the mutually facing surfaces of the first and second substrates. It is to be noted that the outer surface of the first substrate is a surface on a side opposite to the side close to the mutually facing face included in the first substrate to serve as a surface exposed to the mutually facing face of the second substrate.

In the display apparatus according to the present disclosure, by applying a voltage determined in advance between the first and second electrodes, the operation of the electrophoretic device can be controlled. Thus, in comparison with a configuration in which the external edge of the first substrate and the first electrode is not folded back, a larger effective display area can be ensured without enlarging the entire structure.

DETAILED DESCRIPTION OF THE PREFERRED EMBODIMENTS

An embodiment of the present disclosure is explained in detail by referring to accompanying diagrams as follows.

Figure 1:
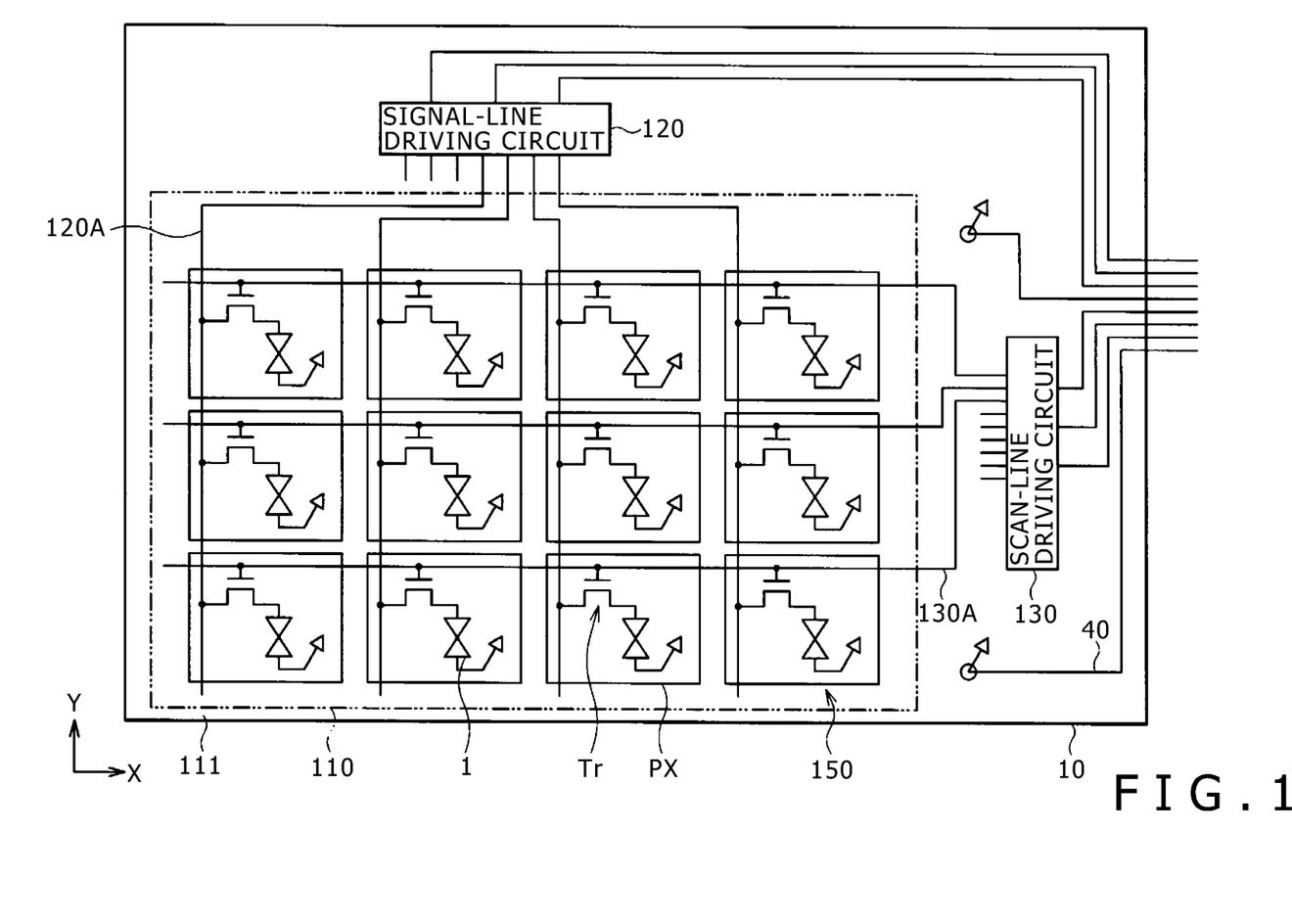
FIG. 1 is a block diagram showing the circuit configuration of a display apparatus according to an embodiment of the present disclosure.

FIG. 1 is a block diagram showing the circuit configuration of a display apparatus provided with electrophoretic devices to serve as a display apparatus according to an embodiment of the present disclosure.

This display apparatus is an electrophoretic display apparatus making use of an electrophoretic phenomenon in order to display an image such as character information. Such an electrophoretic display apparatus is also referred to as the so-called electronic paper display apparatus. As shown in the figure, the display apparatus typically includes a driving substrate 10, a main display section 110 and an auxiliary display section 111 which are created on the driving substrate 10. The main display section 110 is a portion used for displaying an image such as character information whereas the auxiliary display section 111 is a portion surrounding the main display section 110. On the back surface of the driving substrate 10, a signal-line driving circuit 120 and a scan-line driving circuit 130 are typically created to serve as drivers for driving operations to display an image.

On the main display section 110, a plurality of pixels PX are laid out two-dimensionally to form a matrix. In addition, a pixel driving circuit 150 is also created on the main display section 110 to serve as a driver for driving the pixels PX. In the pixel driving circuit 150, a plurality of signal lines 120A are provided, being oriented in the column direction also referred to as the Y-axis direction. In the following description, the signal lines 120A are also referred to as signal lines 120A1, 120A2, - - - and 120Am. In addition, also in the pixel driving circuit 150, a plurality of scan lines 130A are provided, being oriented in the row direction also referred to as the X-axis direction. In the following description, the scan lines 130A are also referred to as scan lines 130A1, 130A2, - - - and 130An. At each of intersections of the signal lines 120A and the scan lines 130A, one of the pixels PX is located. Each of the pixels PX includes a driving transistor Tr and an electrophoretic device 1. The signal lines 120A are connected to the signal-line driving circuit 120 whereas the scan lines 130A are connected to the scan-line driving circuit 130.

The signal-line driving circuit 120 supplies the voltage of a video signal to a selected pixel PX through a signal line 120A. The video signal represents brightness information supplied from a signal supplying source not shown in the figure.

The scan-line driving circuit 130 includes a shift register for sequentially shifting a start pulse synchronously with input clock pulses. The scan-line driving circuit 130 scans the pixels PX in row units in an operation to write the video signals into the pixels PX in order to sequentially supply scan signals to the pixels PX through the scan lines 130A in row units.

The pixel driving circuit 150 is provided on a hierarchical layer between a support substrate 11 of the driving substrate 10 and the electrophoretic device 1. The support substrate 11 will be described later. The pixel driving circuit 150 is configured to include a plurality of aforementioned signal lines 120A, a plurality of aforementioned scan lines 130A and a plurality of aforementioned driving transistors Tr. The driving transistor Tr is an ordinary TFT (Thin-Film Transistor). Typically, the configuration of the driving transistor Tr can be a reversed stagger structure also referred to as the so-called bottom-gate structure or can be a stagger structure also referred to as the so-called top-gate structure. However, configurations of the driving transistor Tr are by no means limited to the reversed stagger structure and the stagger structure. It is to be noted that, if a TFT is used as the driving transistor Tr, the TFT can be an inorganic TFT making use of an inorganic semiconductor layer as a channel layer or can be an organic TFT making use of an organic semiconductor layer as the channel layer.

Typically, the gate electrode of the driving transistor Tr is connected to a scan line 130A for supplying a scan signal generated by the scan-line driving circuit 130 to the gate electrode. In addition, the source electrode of the driving transistor Tr is typically connected to a signal line 120A for supplying a video signal generated by the signal-line driving circuit 120 to the source electrode. On top of that, the drain electrode of the driving transistor Tr is connected to one of the terminals of the electrophoretic device 1 employed in a pixel PX including the driving transistor Tr. The other terminal of the electrophoretic device 1 is connected to a facing electrode 22 provided on a facing substrate 20 to face the driving substrate 10. The facing electrode 22 and the facing substrate 20 will be described later.

Figure 2A:
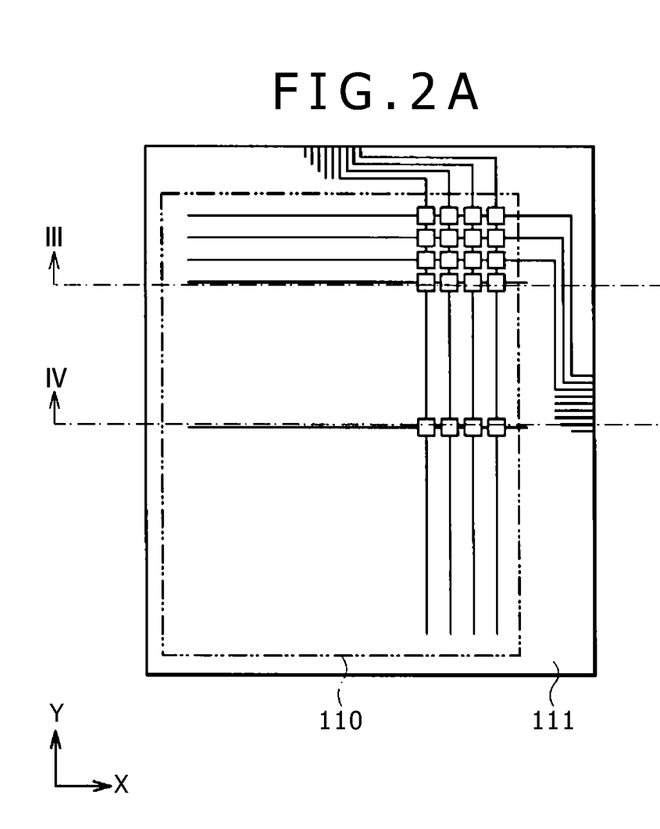
FIGS. 2A and 2B are top-view and bottom-view diagrams each showing a rough configuration of the display apparatus shown in FIG. 1.
Figure 2B:
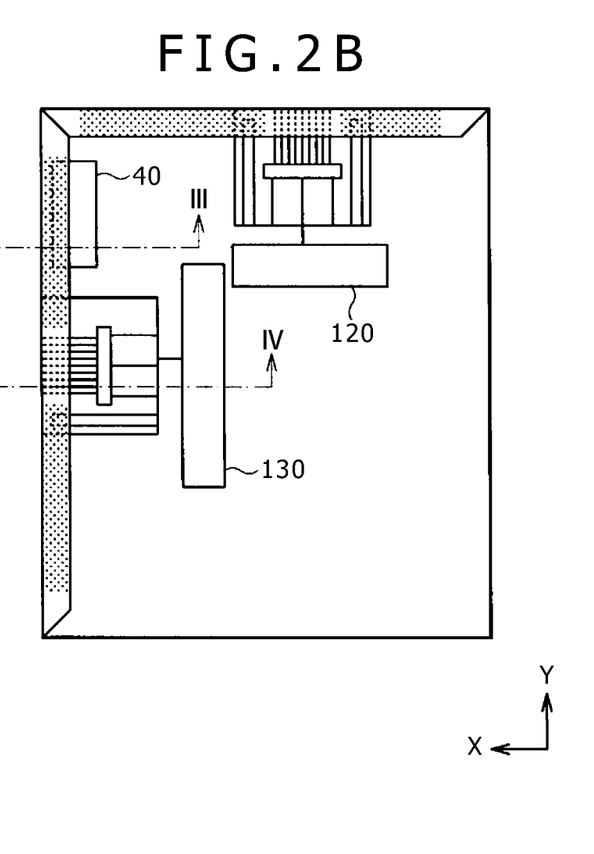

FIGS. 2A and 2B are diagrams each showing a typical configuration of the display apparatus including the main display section 110 spread on an XY plane. To be more specific, FIG. 2A is a top-view diagram showing the display apparatus seen from a side close to a display surface used for displaying an image. On the other hand, FIG. 2B is a bottom-view diagram showing the display apparatus seen from a side opposite to the side close to the display surface.

Figure 3:
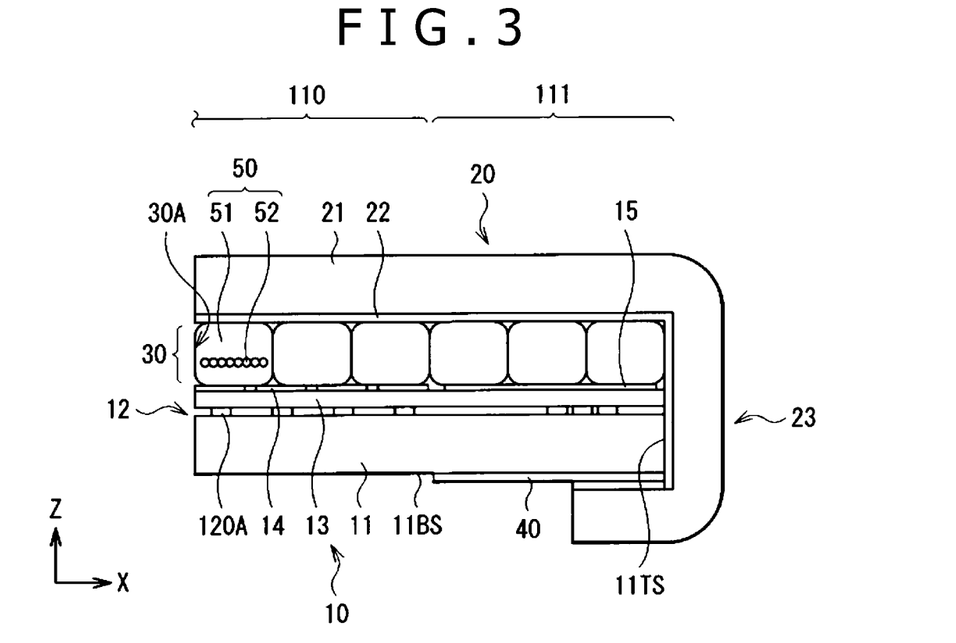
FIG. 3 is a cross-sectional diagram showing the configuration of a portion of the display apparatus shown in FIG. 1.

FIG. 3 is a cross-sectional diagram showing the configuration of a portion of the display apparatus as seen in the direction of an arrow along a III-III line shown in FIGS. 2A and 2B.

As shown in FIG. 3, in the display apparatus, the driving substrate 10 and the facing substrate 20 are exposed to each other through an electrophoretic-device layer 30 including a plurality of microcapsules 30A. With such a display apparatus, an image can be observed from a side close to the facing substrate 20.

The driving substrate 10 is typically constructed by sequentially creating a wiring layer 12, a semiconductor layer 13 and a plurality of pixel electrodes 14 on the surface of the support substrate 11 of the driving substrate 10 in an order in which the wiring layer 12, the semiconductor layer 13 and the pixel electrode 14 are enumerated in this sentence. The wiring layer 12 includes a plurality of aforementioned signal lines 120A and a plurality of aforementioned scan lines 130A. The signal lines 120A and the scan lines 130A are provided in a cubic space. The signal lines 120A are oriented in a direction perpendicular to a direction in which the scan lines 130A are oriented. The semiconductor layer 13 includes driving transistors Tr. The driving transistors Tr are laid out to form the same matrix as the matrix which the pixels PX are laid out to form. By the same token, the pixel electrodes 14 are laid out to form the same matrix as the matrix which the pixels PX are laid out to form. In addition, on the semiconductor layer 13, an environment electrode 15 is provided to enclose the pixel electrodes 14 inside the XY plane. That is to say, the environment electrode 15 is provided to enclose the main display section 110. An electrophoretic-device layer 30 is also provided between the environment electrode 15 and the facing electrode 22 to create the auxiliary display section 111.

The support substrate 11 is made from typically an organic material, a metallic material, a plastic material or the like. Typical examples of the organic material include silicon (Si), silicon oxide ($SiO_x$), silicon nitride ($SiN_x$) and aluminum oxide ($AlO_x$). The silicon oxide includes glass or spin-off glass (SOG). Typical examples of the metallic material include aluminum (Al), nickel (Ni) and a stainless metal. Typical examples of the plastic material include polycarbonate (PC), polyethylene terephthalate (PET), polyethylene naphthalate (PEN) and polyether ether ketone (PEEK).

The support substrate 11 can be transmissive or non-transmissive. This is because, since the image is displayed on a side close to the facing substrate 20, the support substrate 11 is not absolutely required to be transmissive. In addition, the support substrate 11 may also be a substrate having rigidity like a wafer. The support substrate 11 may also be made from flexible thin-layer glass or a flexible film. However, it is desirable to make the support substrate 11 from flexible thin-layer glass or a flexible film. This is because, by making the support substrate 11 from flexible thin-layer glass or a flexible film, it is possible to implement a display apparatus which is light, flexible or bendable and extremely easy to handle.

The driving transistor Tr is a switching device for selecting a pixel PX employing the driving transistor Tr. It is to be noted that, in the wiring layer 12 and the semiconductor layer 13, the signal lines 120A, the scan lines 130A and the driving transistors Tr are embedded by making use of an insulating resin material such as the polyimide.

The pixel electrode 14 can be made from any one of a variety of conductive materials such as a metallic material, a compound and any other one of their alloys. Typical examples of the metallic material are gold (Au), silver (Ag) and copper (Cu) whereas a typical example of the compound is indium-tin oxide (ITO). The pixel electrode 14 is connected to the driving transistor Tr through typically a contact hole provided in the semiconductor layer 13 but not shown in the figure.

In the same way as the pixel electrode 14, the environment electrode 15 also receives a voltage supplied to the environment electrode 15 by way of a switching device such as a TFT provided in the semiconductor layer 13. It is to be noted that this switching device itself is not shown in the figure. Thus, the auxiliary display section 111 is capable of showing a display which is uniform throughout the entire area. The uniform display is typically a white-color display or a black-color display. The auxiliary display section 111 serves as a frame portion (or an excess white portion) of the main display section 110. It is to be noted that, instead of supplying the voltage to the environment electrode 15 by way of the switching device, the voltage can also be supplied to the environment electrode 15 from an external circuit through typically a separately inserted metallic wire. As another alternative, in the same way, the voltage can also be supplied to the environment electrode 15 from the external circuit through typically a flexible cable or the like. In order to drive the auxiliary display section 111 to carry out an image displaying operation by supplying a voltage from an external circuit to the environment electrode 15 through such a metallic wire, such a flexible cable or the like, however, the voltage to be supplied to the environment electrode 15 must be a relatively large pulse voltage such as a voltage having an amplitude of about ±15 V. In this case, there is concern about noises for a signal provided with a small amplitude such as 3.3 V to serve as a signal used for displaying an image on the main display section 110. If a switching device is provided in the semiconductor layer 13 right below the environment electrode 15, on the other hand, it is possible to drive the auxiliary display section 111 to carry out an image displaying operation by supplying a signal to the environment electrode 15 as a signal having a small amplitude of the same order as the amplitude of the image signal supplied to the main display section 110. Thus, it is possible to sustain a simpler configuration without the need to take a countermeasure against the noises.

The facing electrode 22 is typically created over the entire area of one surface of the support substrate 21 included in the facing substrate 20. That is to say, the facing electrode 22 is a common electrode shared by a plurality of pixels PX. However, the facing electrode 22 can also be created to have a shape of a band.

The support substrate 21 can be made from the same material of the support substrate 11 except that the support substrate 21 must be transmissive. The support substrate 21 is required to be a transmissive substrate because the image is displayed on a side close to the facing substrate 20. The facing electrode 22 is made from a transmissive and conductive material referred to as a transparent electrode material. Typical examples of the transmissive and conductive material include indium-tin oxide (ITO), antimony-tin oxide (ATO), fluorine-doped tin oxide (FTC)) and aluminum-doped zinc oxide (AZO).

If the image is displayed on a side close to the facing substrate 20, the electrophoretic-device layer 30 is seen through the facing electrode 22. Thus, it is desirable to make use of the facing electrode 22 having as high an optical transmissivity (a transmittance) as possible. For example, a transmittance equal to or higher than 80% is desirable. In addition, it is desirable to make use of the facing electrode 22 having as low an electrical resistance as possible. For example, an electrical resistance equal to or lower than 100 ohms/opening is desirable.

In addition, the external edge of the facing substrate 20 is folded back so as to form a fold-back portion 23 covering at least a portion of the terminal surface 11TS of the support substrate 11 of the driving substrate 10. The fold-back portion 23 of the facing substrate 20 is formed to cover also the periphery (or the external edge) of the back surface 11BS of the support substrate 11 of the driving substrate 10. In the vicinity of the external edge of the driving substrate 10, a common electrical potential driving electrode used for external connection is provided. In the following description, the common electrical potential driving electrode is also referred to simply as a driving electrode 40. The driving electrode 40 and the external edge of the facing electrode 22 is joined to each other on the back surface 11BS of the support substrate 11 of the driving substrate 10. A method for joining the driving electrode 40 and the external edge of the facing electrode 22 to each other can be selected properly from a number of normally adopted different methods such as the pressure bonding method, the welding method and the soldering joining method. The driving electrode 40 electrically connects the facing electrode 22 to a power supply circuit provided externally but not shown in the figure. The driving electrode 40 carries out a function to supply an electric potential determined in advance to the facing electrode 22. The driving electrode 40 is created by attaching a metallic film to the driving substrate 10 by adoption of typically the evaporation method or the sputtering method. In addition, the driving electrode 40 can also be an electrode having a highly adherent metallic foil tape adhered thereto. It is to be noted that the power supply circuit can also be provided on the back surface 11BS of the support substrate 11 of the driving substrate 10. In such a configuration, the electrode terminal of the power supply circuit is directly connected to the facing electrode 22.

Figure 4:
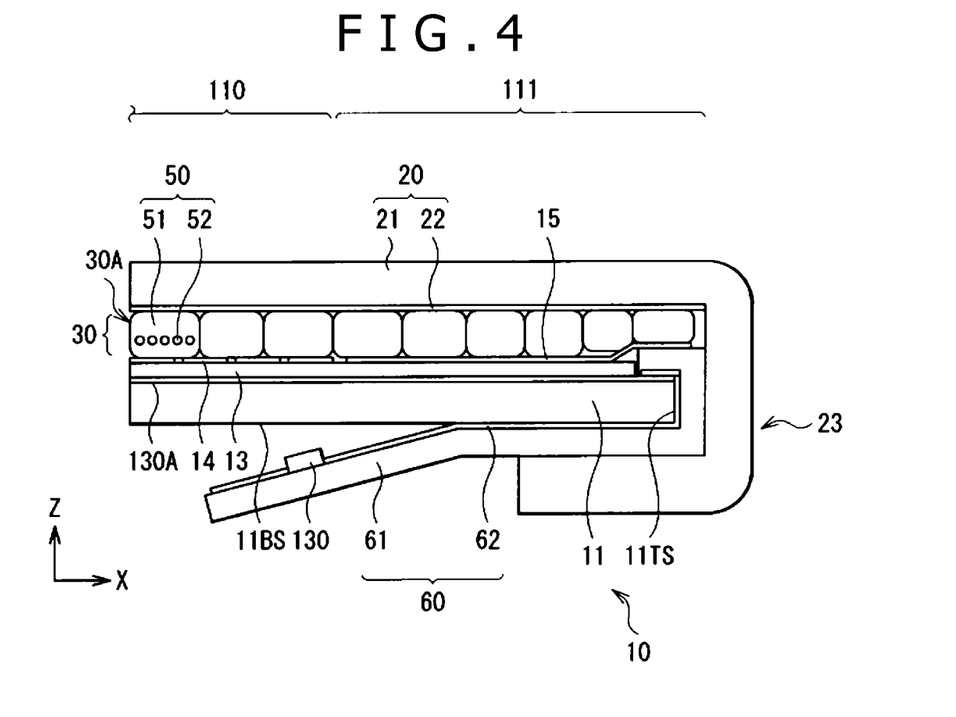
FIG. 4 is a cross-sectional diagram showing the configuration of a portion of the display apparatus shown in FIG. 1.

FIG. 4 is a cross-sectional diagram showing the configuration of a portion of the display apparatus as seen in the direction of an arrow along a IV-IV line shown in FIGS. 2A and 2B. The cross section shown in FIG. 4 includes a scan line 130A extended in the X-axis direction. The scan line 130A is extended to the edge of the support substrate 11, and a draw portion 60 is provided on the edge of the support substrate 11. The draw portion 60 includes a holding base 61 and a draw wire 62 created from copper or the like on the surface of the holding base 61. The draw portion 60 is extended so that the draw portion 60 is folded back from the edge of the support substrate 11 to the back surface 11BS of the support substrate 11 through the terminal surface 11TS of the support substrate 11. That is to say, the draw portion 60 is sandwiched between the fold-back portion 23 of the facing substrate 20 and the driving substrate 10 so that the draw wire 62 is brought all but into contact with the support substrate 11. The upper surface of one end of the scan line 130A is not covered by the semiconductor layer 13 and other components whereas the other end of the scan line 130A is connected to one end of the draw wire 62 connected to the scan-line driving circuit 130. Thus, the scan line 130A is connected to the scan-line driving circuit 130 through the draw wire 62. It is to be noted that the scan-line driving circuit 130 can also be created as a lower layer of the environment electrode 15. That is to say, the scan-line driving circuit 130 can also be created between the support substrate 11 and a hierarchical layer which includes the pixel electrode 14 and the environment electrode 15. In this case, the draw wire 62 needs to be merely connected to a signal line 120A and a power-supply line connected to the scan-line driving circuit 130. Thus, it is no longer necessary to draw a number of scan lines 130A directly to the outside so that the structure can be made simpler. The same structure can be adopted also for the signal-line driving circuit 120. The environment electrode 15 is provided so that the environment electrode 15 covers areas ending at an area corresponding to the edge of the support substrate 11, also surmounting the contact between the semiconductor layer 13 and the draw portion 60. In addition, a space between the environment electrode 15 and the facing electrode 22 facing the environment electrode 15 is completely filled up with the electrophoretic-device layer 30 (that is, the microcapsules 30A). Thus, the function of the auxiliary display section 111 can be carried out till the external edge of the driving substrate 10 without a waste. The reader is advised to keep in mind that, whenever possible, it is desirable to set the thickness of the draw portion 60 at a value equal to the thickness of the semiconductor layer 13. This is because, in order to assure uniformity of the display state at the auxiliary display section 111, it is desirable to hold the gap between the environment electrode 15 and the facing electrode 22 at a fixed value.

The electrophoretic-device layer 30 typically includes an array of densely arranged microcapsules 30A each sealing typically an electrophoretic device 50. The electrophoretic-device layer 30 is provided for the entire area exposed to the facing substrate 20 in the driving substrate 10. It is to be noted that the number of microcapsules 30A is not necessarily equal to the number of pixel electrodes 14. The electrophoretic device 50 makes use of an electrophoretic phenomenon in order to generate contrast. The electrophoretic device 50 has an insulation liquid unit 51 and a plurality of electrophoretic particles 52.

The insulation liquid unit 51 may be, for example, any one or any combination of two or more types of organic solvent. To put it concretely, the insulation liquid unit 51 is made from paraffin, isoparaffin or the like. It is desirable to make use of the insulation liquid unit 51 having as low a degree of viscosity as possible and as low a refraction index as possible. This is because the mobility of the electrophoretic particle 52 is improved to give a higher response speed, and the amount of energy required for moving the electrophoretic particle 52 is small to result in small power consumption.

It is to be noted that, as necessary, the insulation liquid unit 51 may include a variety of materials such as a coloring agent, an electric-charge controlling agent, a dispersion stabilizer, a viscosity modifier, a boundary-face activator and resin.

The electrophoretic particles 52 are electrical-charge particles dispersed in the insulation liquid unit 51. The electrophoretic particle 52 can be moved in the microcapsule 30A by an electrical field. The electrophoretic particle 52 may be, for example, any one or any combination of two or more types of particles (or powders) such as the particles of an organic colorant, an inorganic colorant, a dye compound, a carbon material, a metallic material, a metallic oxide, glass or a high-polymer material. In addition, typically, the electrophoretic particle 52 can also be a smashed particle of a solid content including the particle described above or a capsule particle. It is to be noted that a material corresponding to the carbon material, the metallic material, the metallic oxide, the glass or the high-polymer material is assumed to be a material defecated from a material corresponding to the organic colorant, the inorganic colorant or the dye compound.

Typical examples of the organic colorant include the azoic series colorant, the metal complex azoic series colorant, the poly-condensation azoic series colorant, the flavanthrone series colorant, the benzimidazolone series colorant, the phthalocyanine series colorant, the quinacridone series colorant, the anthraquinone series colorant, the perylene series colorant, the perinone series colorant, the anthrapyridines series colorant, the pyranthrone series colorant, the dioxazine series colorant, the thioindigo series colorant, the isoindolinone series colorant, the quinophthalone series colorant and the indanthrene series colorant. On the other hand, typical examples of the inorganic colorant include the zinc oxide, the antimony white, the carbon black, the iron black, the titanium boride, the colcothar, the Mapico Yellow, the minimum, the cadmium yellow, the zinc sulfide, the lithopone, the barium sulfide, the cadmium selenide, the calcium carbonate, the barium sulfate, the lead chromate, the zinc sulfate, the barium carbonate, the zinc white and the aluminum white. Typical examples of the dye compound cited above includes the nigrosine series dye compound, the azoic series dye compound, the phthalocyanine series dye compound, the quinophthalone series dye compound, the anthraquinone series dye compound and the methine dye compound. Typical examples of the carbon material include the carbon black. Typical examples of the metallic material include gold, silver and copper. Typical examples of the metallic oxide include the titanium oxide, the zinc oxide, the zirconium oxide, the barium titanate, the potassium titanate, the copper-chromium oxide, the copper-manganese oxide, the copper-iron-manganese oxide, the copper-chrome-manganese oxide and the copper-iron-chrome oxide. Typical examples of the high-polymer material include a high-polymer compound containing a functional group having a light absorption area in the visible-light domain. The type of the high-polymer material is not prescribed in particular as long as the high-polymer compound containing a functional group having a light absorption area in the visible-light domain is used as the high-polymer material.

A concrete material used for making the electrophoretic particle 52 is selected in accordance with the role played by the electrophoretic particle 52 in order to generate contrast. To put it concretely, typical examples of the material of the electrophoretic particle 52 providing a bright display include metallic oxides such as the titanium oxide, the zinc oxide, the zirconium oxide, the barium titanate and the potassium titanate. On the other hand, typical examples of the material of the electrophoretic particle 52 providing a dark display include carbon materials and metallic oxides. Typical examples of the carbon materials include the carbon black. On the other hand, typical examples of the metallic oxide include the copper-chromium oxide, the copper-manganese oxide, the copper-iron-manganese oxide, the copper-chrome-manganese oxide and the copper-iron-chrome oxide. The carbon materials are particularly desirable. This is because, with the carbon materials, it is possible to obtain excellent chemical stability, excellent mobility and an excellent light absorption characteristic.

If the electrophoretic particle 52 is configured to provide a bright display, a color recognized when seeing the electrophoretic particle 52 from the outside as the color of the electrophoretic particle 52 is not prescribed in particular. That is to say, the color of the electrophoretic particle 52 can be any color as long as the color is capable of generating contrast. However, a color close to the white color is specially desirable whereas the white color itself is even more desirable. If the electrophoretic particle 52 is configured to provide a dark display, on the other hand, a color recognized when seeing the electrophoretic particle 52 from the outside as the color of the electrophoretic particle 52 is also not prescribed in particular. That is to say, the color of the electrophoretic particle 52 can also be any color as long as the color is capable of generating contrast. However, a color close to the black color is specially desirable whereas the black color itself is even more desirable. This is because, in either case, high contrast can be generated.

The reader is advised to keep in mind that it is desirable to make use of an electrophoretic particles 52 which can be dispersed and are each easy to electrically charge in the insulation liquid unit 51 over a long period of time. It is thus possible to make use of a dispersion agent (or an electrical-charge adjustment agent) for dispersing the electrophoretic particles 52 on the basis of electrostatic reactions or carry out surface processing on the electrophoretic particles 52. As an alternative, it is possible to make use of the dispersion agent and carry out the surface processing.

Typical examples of the dispersion agent include a Solsperse series made by Lubrizol Corporation, a BYK series and an Anti-Terra series which are made by BYK-Chemie Corporation and a Span series made by ICI Americas Corporation.

Typical examples of the surface processing include rosin processing, boundary-face activation agent processing, colorant derivative processing, coupling agent processing, graft polymerization processing and micro-capsule conversion processing. Among these various kinds of surface processing, the graft polymerization processing, the micro-capsule conversion processing and their combination are desirable. This is because long-time dispersion stability can be obtained.

A typical example of a material for the surface processing is an absorptive material which is a material having a functional group allowing absorption onto the surface of the electrophoretic particle 52 and a functional group allowing polymerization. The type of the functional group allowing absorption is selected in accordance with the material used for making the electrophoretic particle 52. As an example, for a carbon material such as the carbon black, an aniline derivative such as the 4-vinyl aniline is selected. As another example, for a metallic compound, an organosilane derivative such as the methacrylic acid 3-(trimethoxysilyl) propyl is selected. Typical examples of the polymerization functional group include the vinyl group, the acryl group and the methacryl group.

In addition, another typical example of a material for the surface processing is a graft-characteristic owning material meaning a material that can be grafted on the surface of the electrophoretic particle 52 containing the polymerization functional group. It is desirable to provide a graft-characteristic owning material having the polymerization functional group and a dispersion functional group which allows dispersions in the insulation liquid unit 51 and is capable of holding dispersibility due to a cubic barrier. The type of the polymerization functional group is selected in the same way as the selection of the type of the functional group allowing absorption. As an example, if the insulation liquid unit 51 is paraffin, the dispersion functional group is the acryl group. In order to polymerize and graft the graft-characteristic owning material, typically, it is nice to make use of a polymerization starting agent such as the azobisisobutyronitrile (AIBN).

It is to be noted that the electrophoretic device 50 does not have to be encapsulated in the microcapsule 30A. In this case, the electrophoretic device 50 may be configured to include a multi-hole structural body containing a plurality of non-electrophoretic particles in the insulation liquid unit 51 in addition to a plurality of electrophoretic particles 52. The non-electrophoretic particle has an optical reflection characteristic different from that of the electrophoretic particle 52. As an alternative, the electrophoretic device 50 may be configured to include a structure compartmentalizing a space by making use of ribs separated away from each other by a proper distance.

Operations of the Display Apparatus

In the display apparatus, as shown in FIG. 3, in an initial state, a plurality of electrophoretic particles 52 exist at positions separated away from the facing substrate 20. In this state, if the electrophoretic-device layer 30 is seen from a side close to the facing substrate 20, no contrast is generated. That is to say, no image is displayed.

A pixel PX determined in advance is selected by making use of the driving transistor Tr employed in the pixel PX, and a voltage is applied between the pixel electrode 14 and the facing electrode 22 in order to generate an electric field. In this state, the electrophoretic particle 52 moves to a position in the vicinity of the facing electrode 22. Thus, in the electrophoretic-device layer 30, an electrophoretic particle 52 separated away from the facing substrate 20 coexists with an electrophoretic particle 52 at a position close to the facing substrate 20. As a result, if the electrophoretic-device layer 30 is seen from a side close to the facing substrate 20, contrast is generated. Accordingly, an image is displayed.

Effects of the Embodiment

As described above, in this embodiment, the external edge of the facing substrate 20 having a light transmitting characteristic is the fold-back portion 23 which is folded back so as to cover the terminal surface 11TS of the support substrate 11 of the driving substrate 10 and the back surface 11BS of the support substrate 11. The facing electrode 22 of the fold-back portion 23 is connected to the driving electrode 40 provided on the back surface 11BS of the support substrate 11. By connecting the facing electrode 22 of the fold-back portion 23 to the driving electrode 40 provided on the back surface 11BS, a voltage determined in advance can be applied to the facing electrode 22 through the driving electrode 40. Thus, since the voltage determined in advance is supplied to both the facing electrode 22 and the driving electrode 40, the movement of the electrophoretic device 50 can be controlled. As a result, an image can be displayed on the main display section 110 as well as the auxiliary display section 111 and this image can be observed from a side close to the facing substrate 20. Therefore, a space between the driving substrate 10 and the facing substrate 20 can be filled up with electrophoretic devices 50 up to the peripheries of the mutually facing surfaces of the driving substrate 10 and the facing substrate 20. Thus, in comparison with a configuration in which the external edges of the driving substrate 10 and the facing substrate 20 are not folded back, a larger effective display area can be insured without increasing the size of the whole structure.

Figure 5:
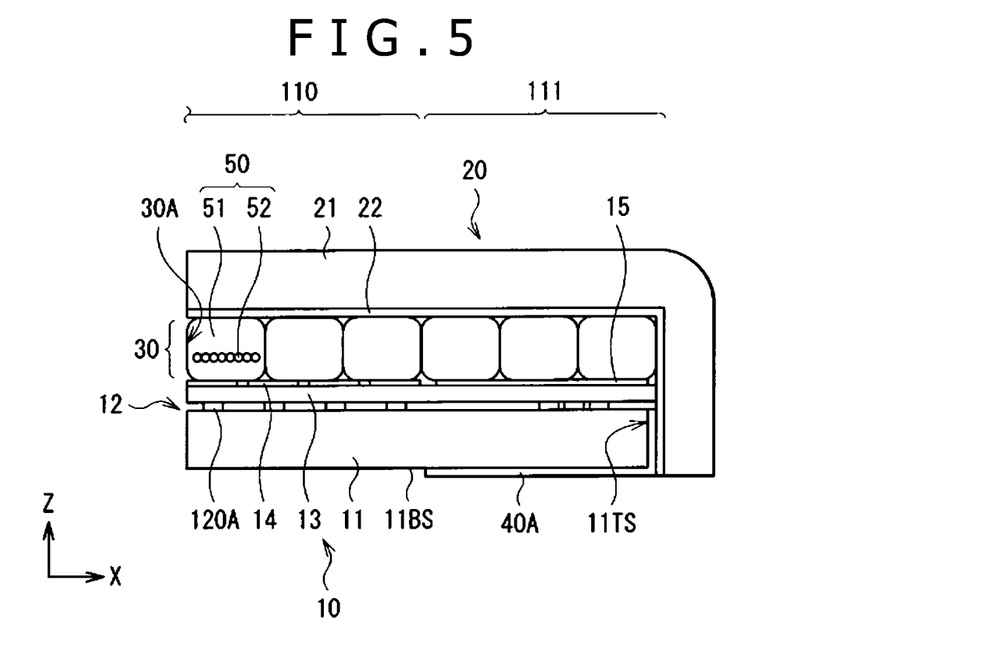
FIG. 5 is a cross-sectional diagram showing the configuration of a portion of a modified version of the display apparatus shown in FIG. 1.

The present disclosure has been exemplified so far by taking an embodiment of the present disclosure as an example. However, implementations of the present disclosure are by no means limited to the explained embodiment. That is to say, the embodiment can be further changed in a variety of ways in order to implement the present disclosure. To put it concretely, in the configuration according to the embodiment described above, the external edge of the facing substrate 20 serving as the first substrate is folded back to reach the back surface 11BS of the support substrate 11 of the driving substrate 10 serving as the second substrate. However, implementations of the present disclosure are by no means limited to this configuration. For example, as shown in FIG. 5, the external edge of the facing substrate 20 can be extended to reach a position exposed to the terminal surface 11TS of the support substrate 11 of the driving substrate 10 without covering the back surface 11BS of the support substrate 11 of the driving substrate 10. In this case, by providing a driving electrode 40A contiguously from the terminal surface 11TS of the support substrate 11 till the back surface 11BS of the support substrate 11, the electrical connection between the facing electrode 22 and the driving electrode 40A can be assured.

Figure 6:
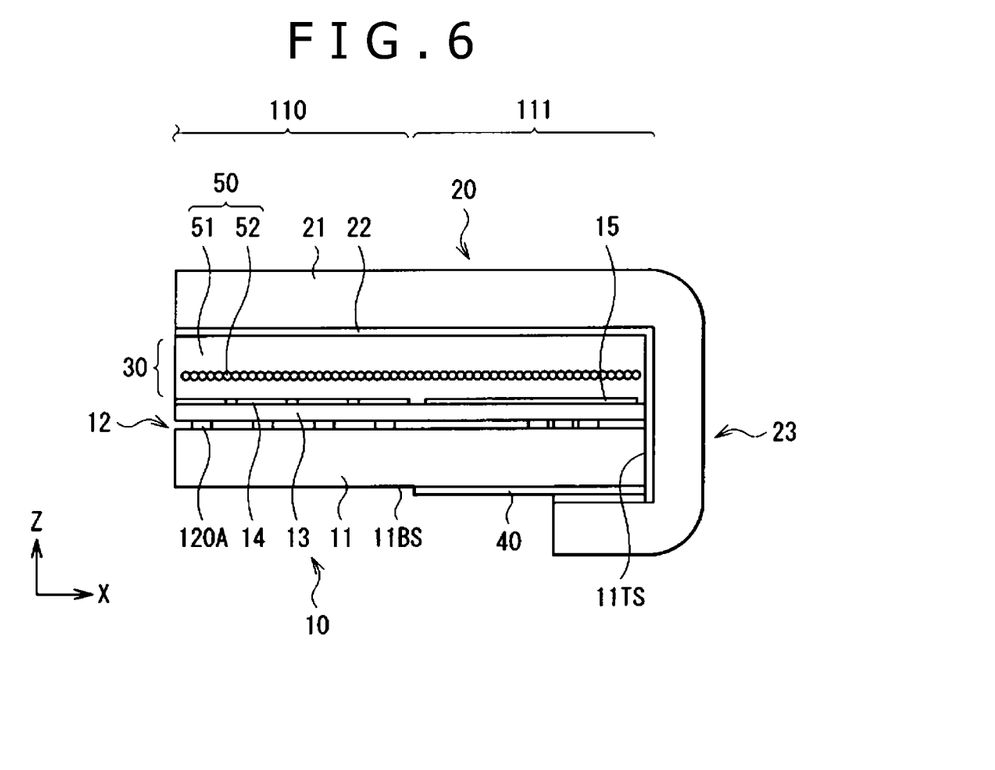
FIG. 6 is a cross-sectional diagram showing the configuration of a portion of another modified version of the display apparatus shown in FIG. 1.

In addition, the electrophoretic-device layer 30 employed in the embodiment described above is explained as a layer having a configuration including a plurality of microcapsules 30A. However, the electrophoretic-device layer 30 does not have to be designed into such a configuration. As shown in FIG. 6 for example, an insulation liquid unit 51 and a plurality of electrophoretic particles 52 can be encapsulated as they are in a space between the driving substrate 10 and the facing substrate 20 without encapsulating them in a microcapsule 30A.

On top of that, the present disclosure can be realized into the following implementations.

1: A display apparatus including:
first and second substrates, at least one of which has a light transmitting characteristic, as well as first and second electrodes provided on the two mutually facing surfaces of the first and second substrates respectively; and
an electrophoretic device provided between the first and second substrates,
wherein the first substrate and the first electrode each have an external edge folded back so as to cover at least a portion of a terminal surface of the second substrate.

2: A display apparatus according to implementation 1 wherein the external edge of the first electrode is connected to a third electrode provided on the second substrate.

3: A display apparatus according to implementation 2 wherein the external edge of the first substrate and the external edge of the first electrode are folded back so as to cover at least a portion of a back surface of the second substrate.

4: A display apparatus according to implementation 3 wherein the third electrode is provided on the back surface of the second substrate.

5: A display apparatus according to any one of implementations 2 to 4 wherein:
the first electrode is a common electrode shared by a plurality of pixels;
the second electrode is a plurality of pixel electrodes each created for one of the pixels; and
the third electrode is a driving electrode for determining an electric potential of the first electrode.

6: A display apparatus according to any one of implementations 1 to 5 wherein the electrophoretic device is created to be exposed to the entire mutually facing surface of the second substrate.

7: A display apparatus according to any one of implementations 1 to 6, the display apparatus further including a plurality of first signal lines and a plurality of second signal lines in a space between the first and second substrates, wherein:
the first signal lines and the second signal lines intersect each other; and
at least one end of each of the first lines and at least one end of each of the second lines are folded back from a terminal surface of the second substrate to a back surface of the second substrate.

8: A display apparatus according to any one of implementations 1 to 7, wherein a signal processing circuit for supplying signals to the first signal lines and the second signal lines is provided on the back surface of the second substrate.

9: A display apparatus according to any one of implementations 1 to 7, wherein a signal processing circuit for supplying signals to the first signal lines and the second signal lines is provided on the upper surface of the second substrate.

10: A display apparatus according to any one of implementations 1 to 9 wherein the electrophoretic device includes a multi-hole structural body containing a plurality of electrophoretic particles and a plurality of non-electrophoretic particles each having an optical reflection characteristic different from that of each of the electrophoretic particles in an insulating liquid unit.

The present disclosure contains subject matter related to that disclosed in Japanese Priority Patent Application JP 2011-081614 filed in the Japan Patent Office on Apr. 1, 2011, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:
1. A display apparatus comprising:
first and second substrates, at least one of which has a light transmitting characteristic, as well as first and second electrodes respectively provided on a first furnace and a second surface of said first and second substrates, the first surface and the second surface facing each other; and
an electrophoretic device provided between said first and second substrates,
wherein said first substrate and said first electrode each have an external edge folded back so as to cover at least a portion of a terminal surface of said second substrate.

2. The display apparatus according to claim 1, wherein said external edge of said first electrode is connected to a third electrode provided on said second substrate.

3. The display apparatus according to claim 2, wherein said external edge of said first substrate and said external edge of said first electrode are folded back so as to cover at least a portion of the back surface of said second substrate.

4. The display apparatus according to claim 3, wherein said third electrode is provided on said back surface of said second substrate.

5. The display apparatus according to claim 2, wherein:
said first electrode is a common electrode shared by a plurality of pixels;
said second electrode is a plurality of pixel electrodes each created for one of said pixels; and
said third electrode is a driving electrode for determining an electric potential of said first electrode.

6. The display apparatus according to claim 1, wherein said electrophoretic device is created to be exposed to said entire mutually facing surface of said second substrate.

7. The display apparatus according to claim 1, said display apparatus further comprising:
a plurality of first signal lines and a plurality of second signal lines in a space between said second substrate and said second electrode, wherein
said first signal lines and said second signal lines intersect each other, and
at least one end of each of said first signal lines and at least one end of each of said second signal lines are folded back from said terminal surface of said second substrate to said back surface of said second substrate.

8. The display apparatus according to claim 1, wherein a signal processing circuit for supplying signals to said first signal lines and said second signal lines is provided on the back surface of said second substrate.

9. The display apparatus according to claim 1, wherein a signal processing circuit for supplying signals to said first signal lines and said second signal lines is provided on the upper surface of said second substrate.

10. The display apparatus according to claim 1, wherein said electrophoretic device includes a multi-hole structural body containing a plurality of electrophoretic particles and a plurality of non-electrophoretic particles each having an optical reflection characteristic different from that of each of said electrophoretic particles in an insulating liquid unit.

* * * * *